US009224381B2

(12) United States Patent
Kajimura

(10) Patent No.: US 9,224,381 B2
(45) Date of Patent: Dec. 29, 2015

(54) AUDIO SIGNAL PROCESSING APPARATUS AND AUDIO SIGNAL PROCESSING SYSTEM

(75) Inventor: Fumihiro Kajimura, Kawasaki (JP)

(73) Assignee: Canon Kabushiki Kaisha, Tokyo (KR)

( * ) Notice: Subject to any disclaimer, the term of this patent is extended or adjusted under 35 U.S.C. 154(b) by 780 days.

(21) Appl. No.: 13/008,730

(22) Filed: Jan. 18, 2011

(65) Prior Publication Data

US 2011/0176032 A1      Jul. 21, 2011

(30) Foreign Application Priority Data

Jan. 19, 2010   (JP) ................. 2010-009262

(51) Int. Cl.
| | | |
|---|---|---|
| G10K 11/16 | (2006.01) | |
| H04N 5/76 | (2006.01) | |
| G10K 11/175 | (2006.01) | |
| G11B 20/10 | (2006.01) | |
| G11B 20/24 | (2006.01) | |

(52) U.S. Cl.
CPC ........ *G10K 11/175* (2013.01); *G11B 20/10527* (2013.01); *G11B 20/24* (2013.01); *G11B 2020/10555* (2013.01)

(58) Field of Classification Search
CPC ............ H04N 9/7921; H04N 2101/00; H04N 5/23238; H04N 2201/3274; G10K 11/175; G11B 20/24; G10L 21/02; G10L 21/00; G10L 15/20; H04B 1/10
USPC ............. 381/94.1, 94.2, 94.5, 94.8, 67, 71.1, 381/71.2, 71.4, 71.8; 704/226, 227, 228; 348/22.1, 224.1, 22
See application file for complete search history.

(56) References Cited

U.S. PATENT DOCUMENTS

| | | | | |
|---|---|---|---|---|
| 5,418,762 | A  * | 5/1995 | Kitayama | 369/13.02 |
| 5,592,550 | A  * | 1/1997 | Davis et al. | 360/69 |
| 6,097,511 | A  * | 8/2000 | Hirasawa et al. | 348/335 |
| 6,639,986 | B2 * | 10/2003 | Kanamori et al. | 381/71.1 |
| 7,254,537 | B2 * | 8/2007 | Otani et al. | 704/233 |
| 7,483,061 | B2 * | 1/2009 | Fredlund et al. | 348/231.4 |
| 7,596,231 | B2 * | 9/2009 | Samadani | 381/94.2 |
| 7,697,699 | B2 * | 4/2010 | Ozawa | 381/94.1 |
| 2003/0053803 | A1* | 3/2003 | Washisu | 396/55 |
| 2004/0032509 | A1* | 2/2004 | Owens et al. | 348/222.1 |
| 2004/0044428 | A1* | 3/2004 | Yoshino | 700/94 |

FOREIGN PATENT DOCUMENTS

| | | | | |
|---|---|---|---|---|
| JP | 2006026241 | A | * | 2/2006 |
| JP | 2006203376 | A | * | 8/2006 |
| JP | 2006270591 | A | * | 10/2006 |
| JP | 2008-053802 | A | | 3/2008 |
| JP | 2008053802 | A | * | 3/2008 |
| JP | 2008077707 | A | * | 4/2008 |

OTHER PUBLICATIONS

Etter, Restoration of a discrete-time signal segment by interpolation based on the left-sided and right-sided autoregressive parameters, 1996.*

* cited by examiner

*Primary Examiner* — Davetta W Goins
*Assistant Examiner* — Kuassi Ganmavo
(74) *Attorney, Agent, or Firm* — Canon USA Inc. IP Division

(57) ABSTRACT

An audio signal processing apparatus does not drive a drive unit in a period during which an audio signal used for noise reduction processing is acquired, or does not stop a recording operation until the audio signal used for noise reduction processing is acquired.

10 Claims, 4 Drawing Sheets

AUDIO SIGNAL PROCESSING APPARATUS AND AUDIO SIGNAL PROCESSING SYSTEM

BACKGROUND OF THE INVENTION

1. Field of the Invention

The present invention relates to an audio signal processing apparatus and an audio signal processing system.

2. Description of the Related Art

Conventionally, an imaging apparatus has been equipped with a function of processing an audio signal obtained with a built-in microphone, an external microphone, or the like, and recording and sending to the outside the audio signal. The imaging apparatus can individually record audio data on a recording medium, record audio data together with moving image data, or record audio data after associating the audio data with still image data. In such an imaging apparatus, noise may be generated as a zoom lens or a focus lens in the imaging apparatus moves or a diaphragm in the imaging apparatus is opened and closed (a drive unit is driven). More specifically, noise may be generated by the driving of the imaging apparatus, and a sound may become difficult to hear when the acquired audio signal is reproduced.

For such an issue, Japanese Patent Application Laid-Open No. 2008-053802, for example, discusses a technique for reducing a noise component included in an audio signal in a section where noise is generated by movement of a magnetic head caused by intermittent recording of a hard disk. Therefore, in Japanese Patent Application Laid-Open No. 2008-053802, a "predicted audio signal" is generated based on audio signals obtained before and after a section where noise is generated (a noise generation section), and is recorded in place of a sound in the noise generation section.

In Japanese Patent Application Laid-Open No. 2008-053802, however, the hard disk is intermittently driven at predetermined intervals, so that the noise caused by the movement of the magnetic head is generated once every several seconds. Therefore, the noise caused by the movement of the magnetic head is not mixed into the audio signals obtained before and after the noise generation section, which are used to generate the predicted audio signal, to be substituted for the sound in the noise generation section. When the hard disk is driven at short time intervals, or when another drive unit is driven, for example, however, noise is mixed into the audio signals obtained before and after the noise generation section, and the noise also affects the "predicted audio signal" generated based on those audio signals. When the hard disk is driven immediately after the recording is started, or when the recording is stopped immediately after the hard disk is driven, there are no audio signals obtained before and after the noise generation section, so that the "predicted audio signal" is not satisfactorily generated.

SUMMARY OF THE INVENTION

The present invention is directed to an audio signal processing apparatus and an audio signal processing system, which enable an audio signal to be substituted for an audio signal in a noise generation section to be satisfactorily generated, to more greatly enhance a noise reduction effect.

According to an aspect of the present invention, an audio signal processing apparatus including an acquisition unit configured to acquire audio signals obtained by converting ambient sounds as electrical signals includes a control unit configured to control an operation of a drive unit provided in the audio signal processing apparatus, a noise reduction unit configured to generate an audio signal to be substituted, out of the audio signals acquired by the acquisition unit, for the audio signal acquired in a period during which the drive unit is operating based on the audio signal or audio signals acquired before and/or after the period, and a recording unit configured to record the audio signal generated by the noise reduction unit on a recording medium, in which the control unit limits the operation of the drive unit for a predetermined period of time elapsed since the start or the end of driving of the drive unit while the recording unit is recording the audio signal.

According to an exemplary embodiment of the present invention, the operation of the drive unit is limited for the predetermined period of time so that noise generated by the driving of the drive unit in the audio signal processing apparatus is not mixed into the audio signal acquired before or after the noise generation section, which is required to generate the audio signal, to be substituted for the audio signal in the noise generation section. Alternatively, the driving of the drive unit is limited in a predetermined section immediately after the start of the recording so that the audio signal having no noise mixed therein is ensured. Alternatively, a recording stop operation is limited in a predetermined section from the end of the last driving of the drive unit so that the audio signal having no noise mixed therein is ensured. This enables the audio signal to be substituted for the audio signal in the noise generation section to be satisfactorily generated, to more greatly enhance the noise reduction effect.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the present exemplary embodiment of the present invention, an imaging apparatus including drive units such as a lens drive unit and a diaphragm mechanism is taken as an audio signal processing apparatus. However, a technical range of the present invention is not limited to this example.

Figure 1:
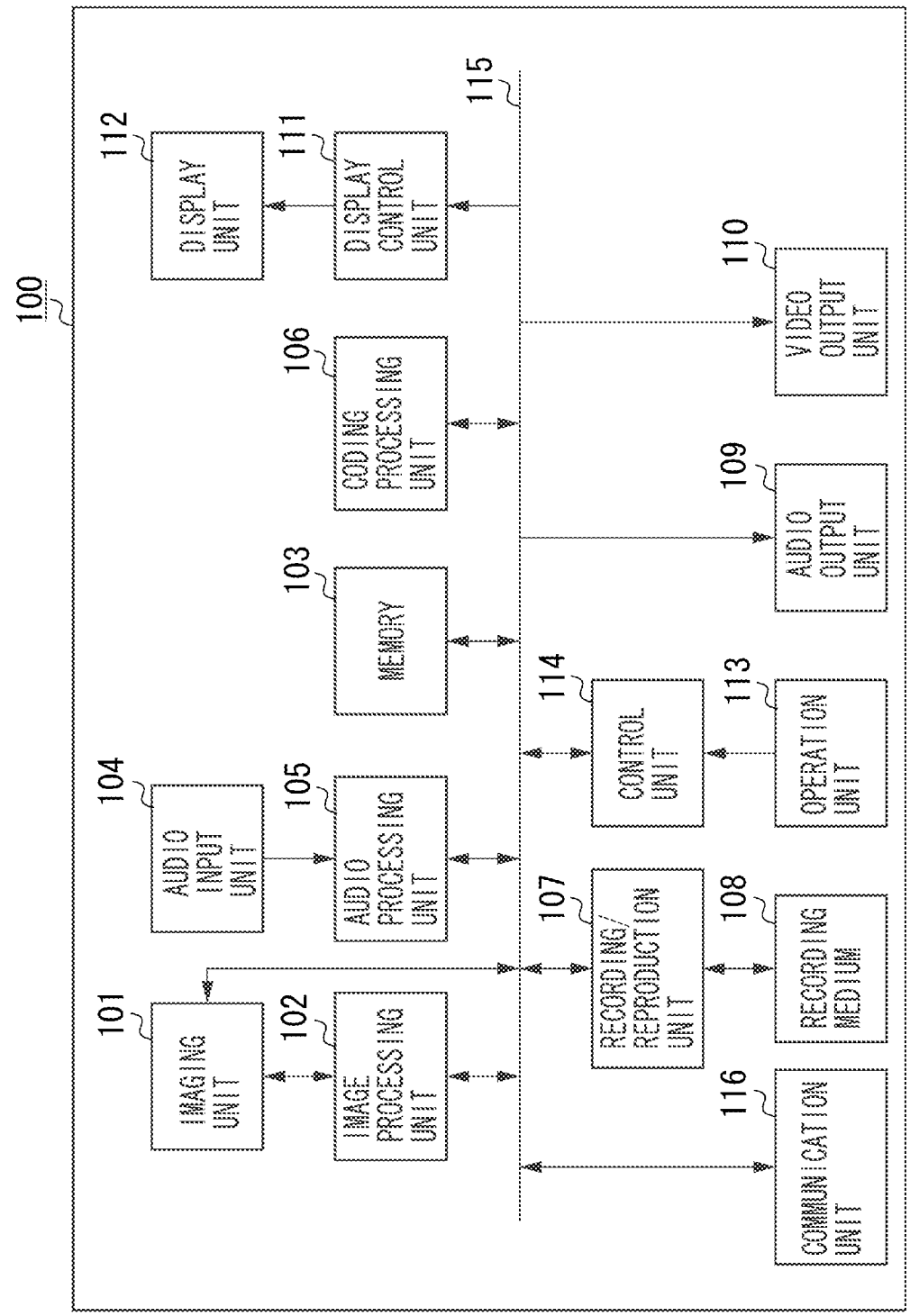
FIG. 1 is a block diagram of an imaging apparatus according to an exemplary embodiment of the present invention.

FIG. 1 is a block diagram illustrating a configuration of an imaging apparatus 100 according to an exemplary embodiment of the present invention.

In FIG. 1, an imaging unit 101 converts an optical image of an object captured by a lens into an image signal with an image sensor such as a charge-coupled device (CCD) sensor or a complementary metal-oxide semiconductor (CMOS) sensor upon control of an amount of light by a diaphragm, converts the image signal into a digital image signal by analog-to-digital conversion, and sends the digital image signal to an image processing unit 102. The image processing unit 102 subjects the input digital image signal to image quality adjustment processing for adjusting white balance, color, brightness, and so on based on set values. The image signal processed by the image processing unit 102 is sent to a memory 103, and a video output unit 110 and a display control unit 111, described below, by a control unit 114, described below.

An audio input unit 104 collects (picks up) sounds around the imaging apparatus 100 with a built-in non-directional microphone or an external microphone connected via an audio input terminal, converts the collected sounds into a digital audio signal by analog-to-digital conversion, and sends the digital audio signal to an audio processing unit 105. The audio processing unit 105 performs processing relating to a sound, such as processing for making the level of the input digital audio signal appropriate and "noise reduction processing", described below. The control unit 114, described below, sends the audio signal processed by the audio processing unit 105 to the memory 103 and an audio output unit 109, described below. The memory 103 temporarily stores the image signal and the audio signal, which are respectively obtained by the image processing unit 102 and the audio processing unit 105.

A coding processing unit 106 reads out the image signal and the audio signal, which are temporarily stored in the memory 103, and codes the image signal and the audio signal, to generate a compressed image signal and a compressed audio signal. The control unit 114 sends the compressed image signal and the compressed audio signal to a recording/reproduction unit 107. The recording/reproduction unit 107 records the compressed image signal and the compressed audio signal, which have been generated by the coding processing unit 106, and other control data relating to imaging on a recording medium 108. When the audio signal is not compressed and coded, the control unit 114 sends the audio signal generated by the audio processing unit 105 and the compressed image signal generated by the coding processing unit 106 to the recording/reproduction unit 107, and records the audio signal and the compressed image signal on the recording medium 108.

The recoding/reproduction unit 107 reads out (reproduces) the compressed image signal, the compressed audio signal, the audio signal, various types of data, and a program, which have been recorded on the recording medium 108. The control unit 114 sends the compressed image signal and the compressed audio signal, which have been read out, to the coding processing unit 106. The coding processing unit 106 temporarily stores the compressed image signal and the compressed audio signal in the memory 103, decodes the compressed image signal and the compressed audio signal in a predetermined procedure, and sends the decoded audio signal to the audio output unit 109 and sends the decoded image signal to the video output unit 110 and the display control unit 111. When the audio signal is recorded on the recording medium 108 without being compressed, the control unit 114 directly sends the audio signal to the audio output unit 109.

The audio output unit 109 includes an audio output terminal, for example, and sends the audio signal to output a sound from an earphone or a speaker connected thereto. The audio output unit 109 may be a speaker contained in the imaging apparatus 100 for outputting a sound relating to the audio signal. The video output unit 110 includes a video output terminal, for example, and sends the image signal to display a video on an external display or the like connected thereto.

The audio output unit 109 and the video output unit 110 may be an integrated terminal, e.g., a high-definition multimedia interface (HDMI) (registered trademark) terminal. The display control unit 111 displays on a display unit 112 a video relating to the image signal sent from the coding processing unit 106 or the image signal sent from the image processing unit 102, an operation screen (menu screen) for operating the imaging apparatus 100, or the like. The display unit 112 may be any display device such as a liquid crystal display, an organic electroluminescent (EL) display, or an electronic paper, for example.

An operation unit 113 includes a button, a dial, and so on, and sends an instruction signal to the control unit 114 according to a user's operation. The control unit 114 sends a control signal to each of blocks in the imaging apparatus 100 based on the instruction signal sent from the operation unit 113, to control the block. The operation unit 113 includes a power button, a recording start button, a menu display button, a set button, a cursor key, a pointing device for designating any point on the display unit 112, and a touch panel, for example. The control unit 114 includes a central processing unit (CPU) (a microprocessing unit (MPU)), and a memory (a dynamic random access memory (DRAM), and a static random access memory (SRAM)), for example.

A bus 115 sends various types of data, a control signal, or the like, to each of the blocks in the imaging apparatus 100.

A communication unit 116 performs communication between the imaging apparatus 100 and an external apparatus, for example, sends and receives data, such as an audio signal, an image signal, a compressed audio signal, and a compressed image signal. The communication unit 116 sends and receives a control signal relating to imaging such as imaging start and end commands, and other information. The communication unit 116 is a wireless communication module such as an infrared communication module, a Bluetooth (trademark) communication module, a wireless local area network (LAN) communication module, or a wireless universal serial bus (USB) module.

Normal operations of the imaging apparatus 100 according to the present exemplary embodiment will be described.

In the imaging apparatus 100 according to the present exemplary embodiment, when a user operates the power button in the operation unit 113, a start instruction is issued from the operation unit 113 to the control unit 114. The control unit 114 controls a power supply unit (not illustrated), to supply power to each of the blocks in the imaging apparatus 100 upon receipt of the instruction.

When the power is supplied, the control unit 114 confirms, based on the instruction signal from the operation unit 113, which of an imaging mode, a reproduction mode, and other modes is set via a mode changeover switch in the operation unit 113.

In the imaging mode, the imaging apparatus 100 starts imaging when the user operates the recording start button in the operation unit 113 in its imaging standby state. During the imaging, a compressed image signal, a compressed audio signal, or an audio signal is recorded on the recording medium 108. The imaging apparatus 100 ends the imaging when the user operates the imaging end button in the operation unit 113, to enter the imaging standby state again. In the reproduction mode, the imaging apparatus 100 reproduces a compressed image signal or a compressed audio signal relating to a file selected by the user, or an audio signal from the recording medium 108, to output the audio signal from the audio output unit 109, and display a video on the display unit 112.

The imaging mode will be first described. When the operation unit 113 sets the imaging mode, the control unit 114 first sets each of the blocks in the imaging apparatus 100 to its imaging standby state, as described above. When the user operates the recording start button in the operation unit 113 in the imaging standby state so that an imaging start instruction signal is sent, the control unit 114 performs control to send an imaging start control signal to each of the blocks in the imaging apparatus 100 and cause the block to perform an operation, described below.

The imaging unit 101 controls the amount of light of an optical image of the object captured by the lens with the diaphragm, converts the optical image into an image signal with the image sensor, converts the image signal into a digital image signal by analog-to-digital conversion, and sends the digital image signal to the image processing unit 102. The image processing unit 102 performs image quality adjustment processing (white balance, color, brightness, etc.) of the input digital image signal based on set values. The control unit 114 sends the image signal processed by the image processing unit 102 to the display control unit 111 and the memory 103. The display control unit 111 displays a video relating to the received image signal on the display unit 112. The control unit 114 sends to the imaging unit 101 a lens control signal for operating a lens group and the diaphragm, which are not illustrated, in the imaging unit 101 based on the image signal.

The audio input unit 104 digitally converts the analog audio signal obtained by the microphone, and sends an obtained digital audio signal to the audio processing unit 105. The audio processing unit 105 performs processing for making the level of the input digital audio signal approximate, "noise reduction processing", described below, or the like, to output an audio signal. The control unit 114 sends the audio signal processed by the audio processing unit 105 to the audio output unit 109 and the memory 103.

The coding processing unit 106 reads out the image signal and the audio signal, which are temporarily stored in the memory 103, and subjects the image signal and the audio signal to predetermined coding, to generate a compressed image signal and a compressed audio signal. The control unit 114 combines the compressed image signal and the compressed audio signal to form a data stream, and outputs the data stream to the recording/reproduction unit 107. The recording/reproduction unit 107 writes the data stream into the recording medium 108 as a single moving image file under control of a file system such as Universal Disk Format (UDF) or File Allocation Table (FAT). When a sound is not compressed, the control unit 114 outputs the audio signal generated by the audio processing unit 105, together with the compressed image signal generated by the coding processing unit 106, to the recording/reproduction unit 107. The recording/reproduction unit 107 writes the data stream into the recording medium 108 as a single moving image file under control of the file system such as the UDF or the FAT, described above.

The above-mentioned operations are continued during the imaging.

When the user operates the recording button in the operation unit 110 so that an imaging end instruction signal is sent to the control unit 114, the control unit 114 performs control to send an imaging end control signal to each of the blocks in the imaging apparatus 100 and to cause the block to perform an operation, described below.

The image processing unit 102 and the audio processing unit 105 respectively stop sending the image signal and the audio signal to the memory 103. The coding processing unit 106 reads out the remaining image signal and audio signal, which are stored in the memory 103, and performs predetermined coding, to generate a compressed image signal and a compressed audio signal, and stops performing the operation after that.

The control unit 114 combines the last compressed image signal and compressed audio signal to form a data stream, and outputs the data stream to the recording/reproduction unit 107. When a sound is not compressed, the control unit 114 outputs the audio signal generated by the audio processing unit 105 and the compressed image signal to the recording/reproduction unit 107.

The recording/reproduction unit 107 writes the data stream into the recording medium 108 as a single moving image file under control of the file system such as the UDF or the FAT. When the supply of the data stream is stopped, the moving image file is completed, to stop the recording operation.

The control unit 114 sends the control signal to each of the blocks in the imaging apparatus 100 to shift the block to the imaging standby state when the recording operation is stopped, to return to the imaging standby state.

In the imaging standby state, the control unit 114 performs control to cause each of the blocks in the imaging apparatus 100 to perform an operation, described below.

The image processing unit 102 sends the image signal to the display control unit 111, and displays the video relating to the image signal on the display unit 112. The user prepares imaging while viewing a screen displayed in this manner.

The control unit 114 sends the audio signal obtained by the audio processing unit 105 to the audio output unit 109, and outputs the audio signal as a sound from a built-in speaker, or the speaker or the earphone connected thereto. The user can also adjust a manual volume for determining a recording sound volume of the operation unit 113 while hearing the sound output in this manner.

While the sound, together with the image, is recorded in the present exemplary embodiment, only the sound can also be recorded by similar operations to those described above even if the image is not recorded.

In the reproduction mode, the control unit 114 then sends the control signal to each of the blocks in the imaging apparatus 100 to shift the block to a reproduced state, and causes the block to perform an operation, described below.

The recording/reproduction unit 107 reads out a moving image file including the compressed image signal and the compressed audio signal or the audio signal, which have been recorded on the recording medium 108. The control unit 114 sends the compressed image signal and the compressed audio signal, which have been read out, to the coding processing unit 106. If the audio signal is not compressed, the control unit 114 sends the audio signal to the audio output unit 109.

The coding processing unit 106 temporarily stores the compressed image signal and the compressed audio signal in the memory 103, and decodes the signals in a predetermined procedure. The control unit 114 sends the decoded audio signal to the audio output unit 109 and sends the decoded image signal to the video output unit 110 and the display control unit 111. The display control unit 111 displays a video relating to the input image signal on the display unit 112, and the audio output unit 109 outputs a sound relating to the input audio signal from the built-in speaker or the earphone or the speaker connected thereto.

The imaging apparatus according to the present exemplary embodiment records and reproduces the image and the sound, as described above.

The "noise reduction processing" performed in the audio processing unit 105 will be described with reference to FIG.

Figure 2:
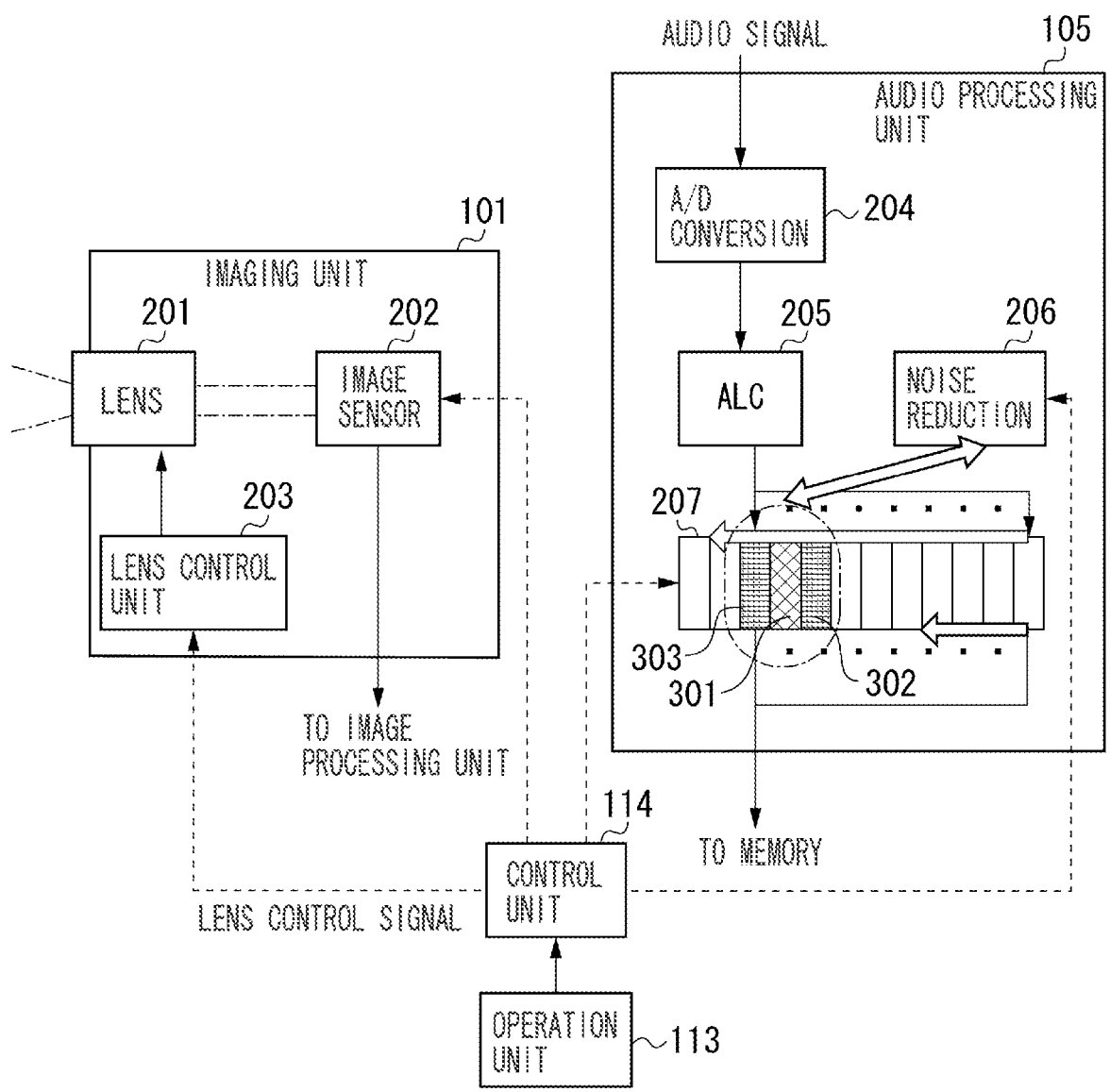
FIG. 2 is a block diagram illustrating details of an imaging unit and an audio processing unit.
Figure 3A:
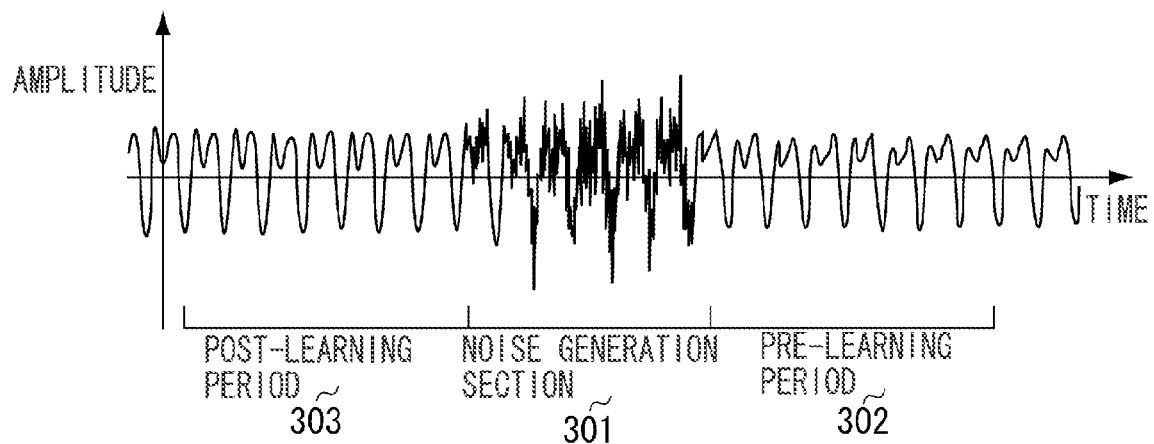
FIGS. 3A to 3C illustrate changes of audio signals by noise reduction processing.
Figure 3B:
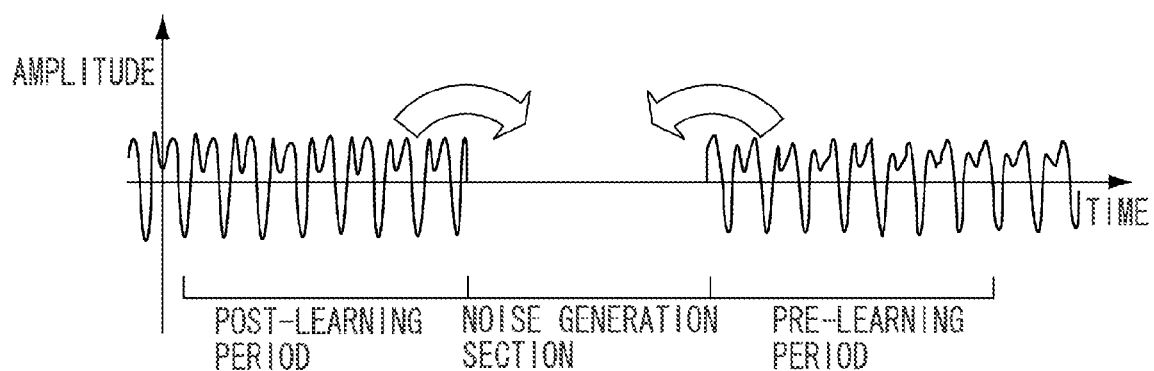
Figure 3C:
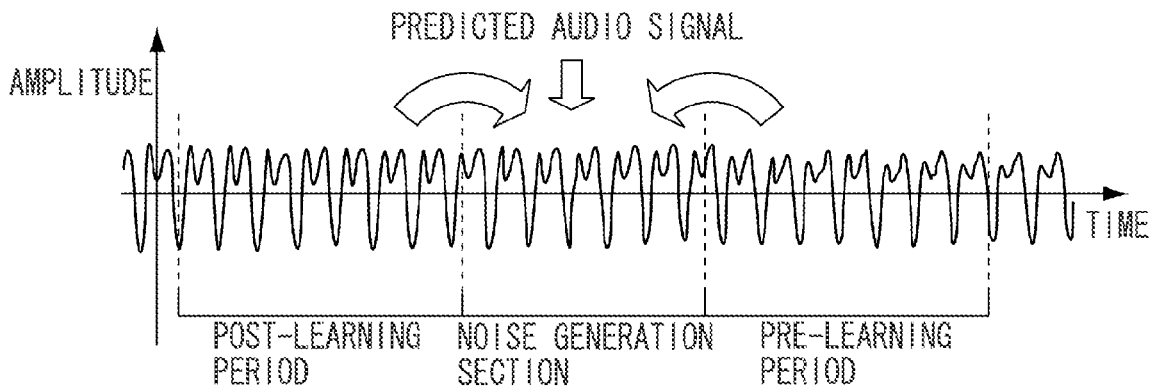

2 and FIGS. 3A to 3C. FIG. 2 illustrates details of the imaging unit 101 and the audio processing unit 105 in the present exemplary embodiment. FIGS. 3A to 3C illustrate changes of audio signals by the noise reduction processing.

In FIG. 2, a lens 201 includes a lens group for capturing an optical image of an object and a diaphragm. An image sensor 202 converts the optical image of the object captured by the lens 201 into an electrical signal, and includes a CCD sensor or a CMOS sensor, for example. A lens control unit 203 includes a drive motor (a drive unit) for driving the lens 201, a microcomputer (a motor control unit) for controlling the drive motor, and so on. The lens control unit 203 moves the lens 201 in response to the lens control signal from the control unit 109.

When automatic focusing is performed, for example, the control unit 114 analyzes the input image signal, and sends a lens control signal representing an amount of lens movement to the lens control unit 203 to move the lens 201 so that the lens 201 is focused on the image signal. Consequently, a motor control unit in the lens control unit 203 controls a driving direction, a driving time, and so on of the drive unit under pulse width modulation (PWM) control or the like to move the lens 201 by the amount of lens movement represented by the lens control signal. Similarly, when luminance (an amount of light) of the object is adjusted, the control unit 114 also sends a lens control signal representing a diaphragm amount to the lens control unit 203. Consequently, the motor control unit in the lens control unit 203 performs control by PWM control or the like to open and close the diaphragm in the lens 201 by the diaphragm amount represented by the lens control signal. While the control unit 114 analyzes the image signal to automatically adjust the lens and the diaphragm this time, the control unit 114 may send the lens control signal to the lens control unit 203, to operate the lens 201 based on the instruction input from the user via the operation unit 113. Similarly, the user may operate the operation unit 113 to enlarge or reduce the optical image of the object, the control unit 114 may send the lens control signal according to the operation, and the lens control unit 203 may move the lens 201 to enlarge or reduce the optical image of the object.

The lens control unit 203 includes a vibration detection unit, and also has the function of adjusting a position of the lens 201 according to vibration, to prevent image shake.

In FIG. 2, an analog to digital (A/D) conversion unit 204 converts an input analog audio signal into a digital audio signal. An automatic level controller (ALC) 205 adjusts the level of the input digital audio signal. The ALC 205 monitors the level of the input audio signal, and reduces, when the level of the audio signal is excessive, the level to an appropriate level. A noise reduction unit 206 is a block for performing "noise reduction processing", described below, in the present exemplary embodiment. A buffer memory 207 sequentially stores digital audio signals, corresponding to a predetermined period of time (e.g., approximately 2.0 seconds), input from the ALC 205. Usually, the control unit 114 sequentially reads out the audio signals that have been sequentially written into the buffer memory 207, a predetermined number of samples (e.g., 512 samples) of the audio signals at a time, beginning with the audio signal most previously written, and sends the audio signals to the memory 103 and the audio output unit 109. The control unit 114 starts to read out the audio signals written into the buffer memory 207 when the audio signals corresponding to 1.5 seconds are stored, for example. Then, the control unit 114 periodically reads out the audio signals corresponding to a predetermined amount to maintain a state where the audio signals corresponding to approximately 1.5 seconds are buffered.

The "noise reduction processing" in the present exemplary embodiment is processing for reducing noise generated when the drive unit in the lens control unit 203 is driven to move the lens 201 and open and close the diaphragm in the lens 201. FIGS. 3A to 3C illustrate waveforms of audio signals that change by the processing. In FIGS. 3A to 3C, the vertical axis indicates an amplitude level of the audio signal, and the horizontal axis indicates time. FIG. 3A illustrates audio signals input to the buffer memory 207. In FIG. 3B, an audio signal in a noise generation period is discarded. In FIG. 3C, a "predicted audio signal" generated based on audio signals obtained before and after the noise generation section is substituted for an audio signal in the noise generation section.

More specifically, the "noise reduction processing" in the present exemplary embodiment is processing for interpolating an audio signal in a noise generation section 301 by an audio signal generated based on an audio signal or audio signals in a part or the whole of a section (a pre-learning period 302) before the section 301 and/or a section (a post-learning period 303) after the section 301. The noise generation section 301 indicates a period during which the drive unit in the imaging apparatus 100 is operating, and the pre-learning period 302 and the post-learning period 303 indicate sections such as 0.05 seconds or 0.02 seconds adjacent to the noise generation section 301.

Therefore, the control unit 114 sends the lens control signal to the lens control unit 203 while issuing an instruction to execute noise reduction processing to the noise reduction unit 206. The noise reduction unit 206 reads out the audio signal or audio signals in the pre-learning period 302 and/or the post-learning period 303 from the buffer memory 207 upon receipt of the instruction. At this time, the audio signal in the noise generation section 301 may be simultaneously readout. The "predicted audio signal" to be substituted for the audio signal in the noise generation section 301 out of the audio signals recorded on the buffer memory 207 is generated from the audio signal or audio signals obtained in the pre-learning period 302 and/or the post-learning period 303. Then, the "predicted audio signal" is written again into an address corresponding to the noise generation section 301 in the buffer memory 207. This operation is performed from the time when the audio signals are written into the buffer memory 207 until they are read out. The "predicted audio signal" is generated based on the audio signal or audio signals in the pre-learning period 302 and/or the post-learning period 303, and is substituted for the audio signal in the noise generation section 301. A method for generating the "predicted audio signal" will be described below.

The noise generation section 301 represents the period during which the drive unit is operating (being driven), as described above. The length of the period differs for each type of the lens, and also differs for each amount of lens movement and amount of adjustment of the diaphragm. In the present exemplary embodiment, information relating to the length of the noise generation section corresponding to the type of the lens, the amount of lens movement, and the amount of adjustment of the diaphragm is stored in the control unit 114 in an imaging apparatus main body. The control unit 114 sends information relating to the length of the noise generation section, together with the instruction to execute the noise reduction processing, to the noise reduction unit 206. The noise reduction unit 206 determines the noise generation section and the sections before and after the noise generation section according to the information. When the type of the lens cannot be specified, for example, the noise generation section may be set to a predetermined period (e.g., 0.3 seconds, 0.4 seconds, 0.5 section, etc.)

The noise reduction unit 206 generates an audio signal ("predicted audio signal") to be substituted for the audio signal in the noise generation section 301 based on the audio signals in the sections before and after the noise generation section 301 (the pre-learning period 302 and the post-learning period 303). When the foregoing will be described again for chronological order, the pre-learning period 302 is a period corresponding to the audio signal acquired before the noise generation section 301, and the post-learning period 303 is a period corresponding to the audio signal acquired after the noise generation section 301. In the present exemplary embodiment, the pre-learning period 302 and the post-learning period 303 are 0.02 seconds or 0.05 seconds, for example, and the noise generation section 301 differs for each type of the lens, drive unit, amount of movement, and amount of adjustment, as described above. For example, in a lens A, the noise generation section 301 is uniformly 0.2 in movement of a focus lens and uniformly 0.1 seconds in driving of a diaphragm. In a lens B, the noise generation section 301 is uniformly 0.25 seconds in movement of a focus lens and uniformly 0.15 seconds in driving of a diaphragm. However, these are illustrative only. In any other periods, the noise reduction processing in the present exemplary embodiment can be executed. In a lens C, the noise generation section 301 may be uniformly 0.5 seconds in movement of a lens and adjustment of a diaphragm. In a lens D, the noise generation section 301 may be uniformly 0.2 seconds, 0.3 seconds, 0.4 seconds, etc., for each amount of movement of a focus lens.

The "noise reduction processing" may be started as soon as the instruction to execute the noise reduction processing is received from the control unit 114, may be started after the audio signal in the noise generation section 301 is acquired, or may be started after the audio signal in the post-learning period 303 is acquired. When the "noise reduction processing" is performed as soon as the instruction to execute the noise reduction processing is received from the control unit 114, for example, the noise reduction unit 206 reads out the audio signal in the pre-learning period 302 immediately upon receipt of the instruction. The audio signal for interpolating the audio signal in the noise generation section 301 is generated based on the audio signal in a part or the whole of the pre-learning period 302. Then, if the noise generation section 301 has elapsed, the generated audio signal is written into the address corresponding to the noise generation section 301 in the buffer memory 207 to interpolate the audio signal in the noise generation section 301. If the noise generation section 301 has not elapsed, the generated audio signal is written into the address corresponding to the noise generation section 301 in the buffer memory 207 after the noise generation section 301 has elapsed. When the "noise generation processing" is started after the audio signal in the post-learning period 303 is acquired, the noise reduction unit 206 starts the "noise generation section" after the noise generation section 301 and the post-learning period 303 have elapsed since it received the instruction. Therefore, the noise generation section 301 may be specified based on the information representing the noise generation section sent from the control unit 114, and the start of the processing may be further delayed only by a period corresponding to the noise generation section 301 and the post-learning period 303 added thereto.

A method for generating an audio signal ("predicted audio signal") to be substituted for an audio signal in the noise generation section 301 will be described. A calculation method using a value of an audio signal in the pre-learning period 302, to calculate audio signal after the pre-learning period 302 will be described below. By sequentially repeating the calculation method, a pre-predicted audio signal using a value of the audio signal in the pre-learning period 302 can be generated.

In the present exemplary embodiment, a linear prediction coefficient is derived, and an audio signal in the noise generation section 301 is calculated using the linear prediction coefficient. In using linear prediction, a linear combination relationship, described below, is assumed between the current signal and a finite number (P) of sampled values adjacent thereto. More specifically, if a sampling rate is 48 kHz, previous 960 samples correspond to the above-mentioned p sampled values when a learning period is 0.02 seconds:

$$x_t = \alpha_1 x_{t-1} + \cdots + \alpha_p x_{t-p} + \epsilon_t \tag{1}$$

The present exemplary embodiment deals with audio signals. Therefore, in the equation (1), $\epsilon_t$ is an uncorrelated random variable, the mean value of which is 0 and the variance of which is $\sigma^2$. When equation (1) is converted, assuming that $x_t$ is calculated from values previous to $x_t$ (i.e., previous values such as $x_{t-1}, x_{t-2}, x_{t-3} \ldots$) the following equation is obtained:

$$x_t = \alpha_1 x_{t-1} + \cdots + \alpha_p x_{t-p} + \epsilon_t = \sum_{i=1}^{p} \alpha_i x_{t-i} + \epsilon_t \tag{2}$$

According to equation (2), if $\epsilon_t$ is sufficiently small, the current value is expressed by a linear sum of p sampled values in its vicinity. After $x_t$ is found by the above-mentioned prediction, if its approximation is sufficiently good, $x_{t+1}$ is also found by a linear sum of p sampled values in its vicinity. If $\epsilon_t$ can be made sufficiently small, a signal can be found by sequentially predicting values. Consider a method for finding $\alpha_i$ (a linear prediction coefficient) to minimize $\epsilon_t$. In the present exemplary embodiment, an operation for finding $\alpha_i$ to minimize $\epsilon_t$ is referred to as a learning operation. Consequently, in the above-mentioned learning section, $\sum \epsilon_t^2$ may be minimized. $\sum \epsilon_t^2$ is expressed by the following equation from the equation (1), where $t_0$ is a start time of learning, and $t_1$ is an end time of learning:

$$\sum_{t=t_0}^{t_1} \epsilon_t^2 = \sum_{t=t_0}^{t_1} \left( x_t - \sum_{i=0}^{p} \alpha_i x_{t-i} \right)^2 = \sum_{t=t_0}^{t_1} \sum_{i=0}^{p} \sum_{j=0}^{p} \alpha_i \alpha_j x_{t-i} x_{t-j} \tag{3}$$

In equation (3), $\alpha_0 = 1$. $c_{ij}$ is expressed by $\sum_{t=t_0}^{t_1} x_{t-i} x_{t-j}$ to simplify equation (3). In order to determine $\alpha_i$ to minimize equation (3), equation (3) may be solved, taking a partial differential relating to $\alpha_j (j=1, 2, \ldots, p)$ as zero. That is, the following equation is obtained:

$$\frac{\partial}{\partial \alpha_j} \sum_{t=t_0}^{t_1} \epsilon_t^2 = \frac{\partial}{\partial \alpha_j} \sum_{i=0}^{p} \sum_{j=0}^{p} \alpha_i c_{ij} \alpha_j = 2 \sum_{i=0}^{p} \alpha_i c_{ij} \tag{4}$$

Equation (4) indicates that $\alpha_i$ can be determined if p simultaneous linear equations are solved. $c_{ij}$ in equation (4) can be found from $x_{t-i}$ ($i=1, 2, \ldots p$).

More specifically, $\alpha_i$ (a linear prediction coefficient) can be found from equation (4).

If $\alpha_i$ is determined according to equation (4), $\Box\Box_t^2$ is minimized. At this time, a value of $x_t$ can be well approximated by $$\Box \sum_{i=1}^{p} \Box_i x_{t\Box i}$$

from equation (2). If this approximation is sufficiently good, $x_t$ can be replaced with $$\Box \sum_{i=1}^{p} \Box_i x_{t\Box i}$$

as a predicted signal.

Further, an approximate value for $x_{t+1}$ can be obtained by similar calculation from (p−1) sampled values in its vicinity and $x_t$ found by prediction. This calculation is sequentially repeated so that signals $x_t, x_{t+1}, x_{t+2}, \ldots$ in a prediction section can be generated. In the present exemplary embodiment, the calculation is repeated until the number of samples of data corresponding to the length of the noise generation section 301 output by the control unit 114 is predicted. This enables a "pre-predicted audio signal" to be generated.

While the "pre-predicted audio signal" is generated based on audio signals corresponding to 0.02 seconds immediately before the noise generation section 301 in the present exemplary embodiment, it may be generated based on audio signals not immediately before but before the noise generation section 301. The "pre-predicted audio signal" may be generated based on not audio signals corresponding to 0.02 seconds but audio signals corresponding to 0.1 seconds or 0.2 seconds before the noise generation section 301.

An operation for generating the "pre-predicted audio signal" is used for calculation beginning with the chronologically newest one of audio signals in the post-learning period 303 so that a "post-predicted audio signal" can similarly be generated.

In the present exemplary embodiment, the "pre-predicted audio signal" and the "post-predicted audio signal", which are found by the calculation in this manner, are cross-fade combined, or the "pre-predicted audio signal" and the "post-predicted audio signal" are respectively used as the first half and the latter half, to generate a predicted audio signal. Only the "pre-predicted audio signal" may constitute a predicted audio signal. The "post-predicted audio signal" may constitute a predicted audio signal.

In the cross-fade combining, at a position closer to the pre-learning period 302, a "pre-predicted audio signal" calculated from the pre-learning period 302 and a "post-predicted audio signal" calculated from the post-learning period 303 are combined, respectively, at a high ratio and a low ratio, to generate a predicted audio signal. In the vicinity of the center of the noise generation section 301, a "pre-predicted audio signal" and a "post-predicted audio signal" are combined, respectively, at approximately the same ratios. At a position closer to the post-learning period 303, a "pre-predicted audio signal" calculated from the pre-learning period 302 and a "post-predicted audio signal" calculated from the post-learning period 303 are combined, respectively, at a high ratio and a low ratio, to generate a predicted audio signal.

The "predicted audio signal" thus generated is substituted for the audio signal in the noise generation section 301, as illustrated in FIG. 3C, to perform the noise reduction processing. More specifically, in the noise reduction unit 206, a value of the generated "predicted audio signal" is written over the address corresponding to the noise generation section 301 in the buffer memory 207.

In the present exemplary embodiment, the noise reduction unit 206 thus overwrites noise in the noise generation section 301 with the predicted audio signal found by the calculation from the audio signal in the pre-learning period 302 and the audio signal in the post-learning period 303, which have no noise mixed therein.

While the method using linear prediction has been described as the "noise reduction processing" in the present exemplary embodiment, other methods may be used as long as an audio signal in the noise generation section 301 is calculated based on a sound in at least either one of the sections before and after the noise generation section 301. For example, a predicted audio signal calculated from either one of an audio signal in the pre-learning period 302 and an audio signal in the post-learning period 303 by linear prediction may be used. Alternatively, a correlation of a highly repetitive waveform of an audio signal in the pre-learning period 302 may be detected, and the repetitive waveform may be used as a predicted audio signal. Similarly, a predicted audio signal may be calculated from an audio signal in the post-learning period 303. More specifically, any method for generating a predicted audio signal based on an audio signal or audio signals before and/or after the noise generation section and substituting the predicted audio signal for an audio signal in the noise generation section may be used.

While the predicted audio signal is overwritten after the audio signal in the noise generation section is discarded, as illustrated in FIG. 3B, in the present exemplary embodiment, the predicted audio signal may be merely written over the address corresponding to the noise generation section in the buffer memory 207 without discarding the audio signal in the noise generation section.

Noise reduction processing in a recording operation (moving image recording, audio recording) of the imaging apparatus 100 according to the present exemplary embodiment and a driving timing and a recording end timing of the drive unit in the driving apparatus 100 will be described below with reference to FIG. 4. In the present exemplary embodiment, the control unit 114 controls each of the units in the imaging apparatus 100 so that no noise is mixed into sounds before and after the noise generation section, which is required to generate the predicted audio signal, or a sound having no noise mixed therein is obtained for a predetermined section immediately after the start of recording or immediately before the stop thereof.

Figure 4:
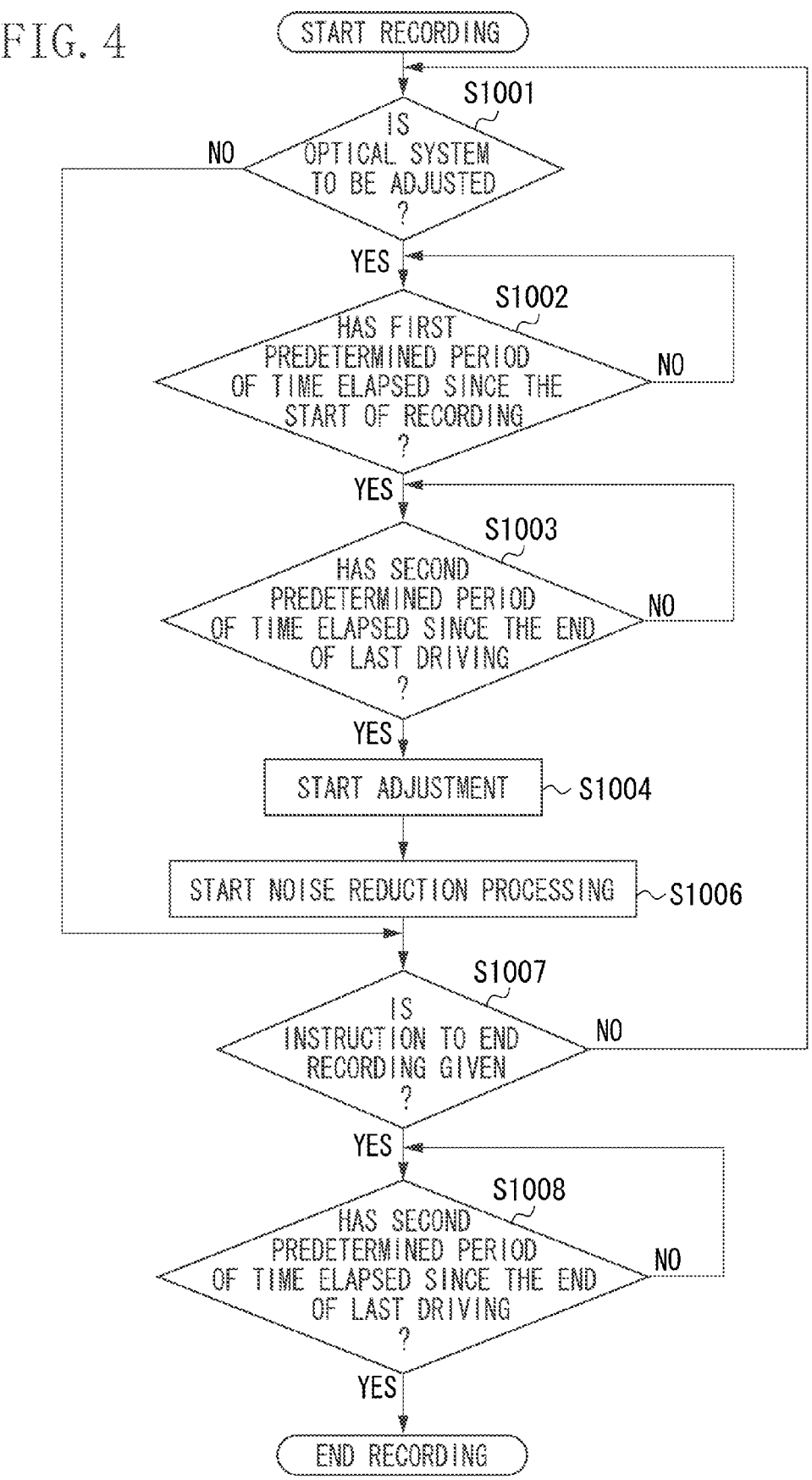
FIG. 4 is a flow chart illustrating operations of an imaging apparatus from the start to the end of a recording operation.

FIG. 4 is a flowchart illustrating operations of the imaging apparatus 100 from the start to the end of a recording operation.

If a user gives an instruction to start recording via the operation unit 113, the control unit 114 starts the above-mentioned recording operation. In step S1001, the control unit 114 analyzes an input image signal, and determines whether a focus of an optical image captured by the lens 201 and an amount of light (luminance) are to be adjusted. If it is determined that the focus of the optical image captured by the lens 201 and the light amount (luminance) are to be adjusted (YES in step S1001), the processing proceeds to step S1002. In step S1002, the control unit 114 determines whether a first predetermined period of time or more has elapsed since the start of the recording.

If the control unit 114 determines that the first predetermined period of time has not yet elapsed since the start of the recording (NO in step S1002), the step S1002 is looped. If the control unit 114 determines that the first predetermined period of time has elapsed since the start of the recording (YES in step S1002), the processing proceeds to step S1003. In step S1003, the control unit 114 determines whether a second predetermined period of time or more has elapsed since the end of last driving of the drive unit for a lens. In the present exemplary embodiment, the control unit 114 takes the time when the length of a noise generation section has elapsed since it sent a lens control signal to the lens control unit 203 as the end of the driving of the drive unit, and determines whether the second predetermined period of time or more has elapsed since the end of the driving.

If the control unit 114 determines that the second predetermined period of time or more has not yet elapsed since the end of the last driving (NO in step S1003), the step S1003 is looped. If the control unit 114 determines that the second predetermined period of time or more has elapsed since the end of the last driving (YES in step S1003), the processing proceeds to step S1004. In step S1004, the control unit 114 analyzes the input image signal, and starts to adjust the focus of the optical image captured by the lens 201 and adjust the light amount (luminance). More specifically, until the first predetermined period of time elapses since the start of the recording, or until the second predetermined period of time elapses since the end of the last driving, the control unit 114 does not output the lens control signal to the lens control unit 203. Therefore, operations of a lens group, a diaphragm, and so on in the lens 201 are inhibited.

The first predetermined period of time aims at ensuring an audio signal in the pre-learning period 302. If 0.02 seconds is used as the length of the pre-learning period 302, therefore, the first predetermined period of time may be 0.02 seconds or more. Approximately 0.5 seconds elapsed since the user started recording may be a predetermined period of time. Thus, noise generated when the user operates the operation unit 113 can be prevented from entering the pre-learning period 302. The second predetermined period of time aims at not generating noise in an audio signal in the pre-learning period 302 or the post-learning period 303. If 0.02 seconds is used as the length of the pre-learning period 302 or the post-learning period 303, therefore, the second predetermined period of time may be 0.02 seconds or more.

In step S1004, the control unit 114 sends a pulsed signal to the lens control unit 203 as a lens driving signal for a focusing operation, for example, and causes the lens control unit 203 to move the lens 201. When an adjustment operation is started, the processing proceeds to step S1006. In step S1006, the control unit 114 sends information representing a noise generation section corresponding to a focusing operation, together with an instruction to start the above-mentioned "noise reduction processing", to the noise reduction unit 206. Consequently, the noise reduction unit 206 starts the "noise reduction processing". The noise generation section is previously determined according to the type of the lens and the operation of the drive unit. The control unit 114 has a table describing a correspondence relationship representing the type of the lens and the operation of the drive unit, and a noise generation section corresponding thereto, and sends information representing the noise generation section to the noise reduction unit 206 based on the table.

In step S1007, the control unit 114 determines whether the user gives an instruction to end recording via the operation unit 113.

If the control unit 114 determines that the focus of the optical image captured by the lens 201 and the amount of light (luminance) are not to be adjusted (NO in step S1001), the control unit 114 also makes the determination in step S1007.

If the instruction to end recording is not given (NO in step S1007), processes in steps S1001 to S1007 are repeated. If the instruction to end recording is given (YES in step S1007), the processing proceeds to step S1008. In step S1008, the control unit 114 determines whether a second predetermined period of time or more has elapsed since the end of the last driving of the drive unit for the lens, like in step S1003. If the control unit 114 determines that the second predetermined period of time or more has not yet elapsed since the end of the last driving (NO in step S1008), the step S1008 is looped. If the control unit 114 determines that the second predetermined period of time or more has elapsed since the end of the last driving (YES in step S1008), the control unit 114 ends the recording operation.

Thus, the operation of the drive unit is inhibited until the first predetermined period of time or more has elapsed since the start of the recording so that the audio signal in the pre-learning period 302 can be ensured, and the audio signal used in the "noise reduction processing" can be ensured. Therefore, a noise reduction effect can be more greatly enhanced. The operation of the drive unit is inhibited until the second predetermined period of time or more has elapsed since the end of the last driving of the drive unit so that noise can be prevented from being mixed into the pre-learning period 302 or the post-learning period 303, and the audio signal used in the "noise reduction processing" can be prevented from being degraded. Therefore, the noise reduction effect can be more greatly enhanced. A recording stop operation is inhibited until the second predetermined period of time or more has elapsed since the end of the last driving of the drive unit so that the audio signal in the post-learning period 303 can be ensured, and the audio signal used in the "noise reduction processing" can be ensured. Even when noise is mixed into a sound representing an instruction to stop recording, therefore, an audio signal for interpolating a sound in a period into which noise is assumed to be mixed using a sound in the post-learning period 303 can be generated. Therefore, the noise reduction effect can be more greatly enhanced.

While the driving of the drive unit is inhibited in the present exemplary embodiment, the drive unit may be operated to a degree that noise cannot be heard. More specifically, the operation of the drive unit may be limited so that the sound volume of the noise generated in the noise generation section 301 is lowered by reducing the speed of the movement of the focus lens or limiting the amount of movement thereof.

While the focusing operation has been described in the present exemplary embodiment, the same is true for a case where a diaphragm operates to control an amount of light and a case where a zoom lens operates. The present invention is applicable to not only the drive unit in the imaging unit 101 but also any drive unit in the imaging apparatus 100.

In a configuration in which a recording end switch generates a click sound, when an instruction to stop recording is issued within a second predetermined period of time elapsed since an imaging operation switch was operated, a recording operation is continued within the second predetermined period of time. The recording operation may be ended after noise reduction processing is performed by generating a predicted audio signal, after the second predetermined period of time has elapsed, using an audio signal in the period of time. More specifically, the recording operation may be ended after the second predetermined period of time has elapsed by inhibiting a recording stop operation until the second predetermined period of time has elapsed since the imaging operation switch was operated.

In that case, the control unit 114 determines approximately 0.2 seconds before and after an operation of the recording end switch as a noise generation section, and overwrites the click sound generated by the recording end switch with the predicted audio signal, to reduce the click sound. Therefore, the recording operation is continued until the predetermined period of time has elapsed since the recording end switch was operated so that an audio signal in a learning section for generating a predicted audio signal to be substituted for an audio signal in the noise generation section can be obtained. Accordingly, an audio signal in which noise generated by the click sound generated by the recording end switch is reduced can be obtained. An operation timing of the recording end switch may be recorded so that audio data at the operation timing or later is not recorded after the "noise reduction processing" in the noise generation section. This enables an audio signal that has been ended at a timing intended by a user can be recorded on the recording medium 108.

There may be two or more recording end switches. If one of the recording end switches generates a click sound, recording may be performed after removing the click sound, as described above. If the other switch does not generate a click sound, recording may be directly stopped. More specifically, it may be determined whether "noise reduction processing" is performed depending on which of the recording end switches is operated at a timing when the recording end switch is operated.

While the control unit 114 determines whether the second predetermined period of time or more has elapsed since the end of the last driving of the drive unit in steps S1003 and S1008 in the present exemplary embodiment, the control unit 114 may determine whether a third predetermined period of time or more has elapsed since the start of the last driving of the drive unit. The third predetermined period of time is a value obtained by adding 50 ms, for example, to the length of the noise generation section 301 of the drive unit that has been driven last time. As described above, the noise generation section 301 differs for each type of the lens, drive unit, and amount of driving. Therefore, the third predetermined period of time is a value that varies according to the drive unit that has been driven last time.

While the control unit 114 determines whether the second predetermined period of time or more has elapsed since the end of the last driving of the drive unit in steps S1003 and S1008, the control unit 114 may similarly determine whether a fourth predetermined period of time or more has elapsed since it sent the lens control signal last time. The fourth predetermined period of time is a value obtained by adding 55 ms, for example, to the length of the noise generation section 301 of the drive unit that has been driven last time. As described above, the noise generation section 301 differs for each type of the lens, drive unit, and amount of driving. Therefore, the fourth predetermined period of time is a value that varies according to the drive unit that has been driven last time. For the fourth predetermined period of time, the period of time to be added is 5 ms longer than that for the third predetermined period of time in consideration of a time difference from the time when the control unit 114 sends the lens control signal to the start of the driving of the drive unit.

In steps S1003 and S1008, the control unit 114 may take the time point where the lens control unit 203 sends a signal indicating that movement of a lens and adjustment of a diaphragm have ended to the control unit 114 as the end of the driving of the drive unit and determine whether the second predetermined period of time has elapsed since the end of the driving.

If the audio signal in the noise generation section is generated (the predicted audio signal is generated) from the audio signal before or after the noise generation section, as in the present exemplary embodiment, when a section to be replaced with the predicted audio signal becomes long, an error from a sound other than actual noise gradually increases. Therefore, the control unit 114 can designate the noise generation section after detecting the noise generation section more accurately. In the present exemplary embodiment, a vibration sensor (accelerometer) may be further used to detect a noise mixing section in the present exemplary embodiment. In this case, a timing when a vibration sensor detects vibration is a timing when an actual drive unit is driven. Therefore, the control unit 114 determines the noise generation section according to a detection result by the vibration sensor, and sends the noise generation section to the noise reduction unit 206.

If an operation of the vibration sensor is made always effective, power consumption is increased. Therefore, the operation of the vibration sensor may be started at a timing when the lens control signal is sent to the lens control unit 203. An operation of an acceleration sensor is ended when a predetermined period of time, e.g., approximately 2 seconds has elapsed. This enables power consumed by the vibration sensor to be reduced.

While the movement of the focus lens and the adjustment of the diaphragm are separately performed in the present exemplary embodiment, the diaphragm may be adjusted while the focus lens is moving, for example. In this case, a period from the start of the movement of the focus lens until later one of the end of the adjustment of the diaphragm and the end of the movement of the focus lens is taken as a noise generation section, to perform "noise reduction processing". Further, in a period elapsed from later one of the end of the adjustment of the diaphragm and the end of the movement of the focus lens until the second predetermined period of time has elapsed, the driving of the drive unit is limited.

In the present exemplary embodiment, to limit the driving of the drive unit, the control unit 114 does not send the lens control signal to the lens control unit 203. However, the control unit 114 may inhibit or limit the driving of the drive unit by sending a signal for inhibiting or limiting the movement of the lens and the adjustment of the diaphragm to the lens control unit 203.

Operations of the imaging apparatus 100 will be described when the drive unit is driven for a relatively long time, i.e., a zoom lens moves and a focus lens moves using a contrast automatic focus (AF) or the like. The contrast AF is a method for moving the focus lens while detecting a contrast of an image and taking a position where the contrast is the highest as an in-focus position. In this method, the image is analyzed while the lens is moved. Therefore, a period of time elapsed until the lens is focused on the image becomes relatively long. A case where the zoom lens is moved will be described as an example.

In the imaging apparatus 100 according to the present exemplary embodiment, when the optical image of the object is enlarged or reduced, the control unit 114 sends the lens control signal to the lens control unit 203, to move the zoom lens while the user is operating a zoom key in the operation unit 113.

When the zoom lens moves for a longer period of time, however, the accuracy of the noise reduction processing is reduced. In the present exemplary embodiment, an operation for temporarily stopping moving the lens when the lens is moved while the zoom key is input, for example, for 0.5 seconds and temporarily stopping moving the lens for 0.5 seconds again after a predetermined period of time has elapsed is repeated. More specifically, the zoom lens is intermittently moved. A period of time during which the zoom lens moves is a noise generation section. Therefore, the imaging apparatus 100 according to the present exemplary embodiment replaces an audio signal in the noise generation section with a "predicted audio signal" generated based on an audio signal in a period at least after the section. Therefore, in the present exemplary embodiment, the control unit 114 limits the movement of the lens for the second predetermined period of time, as described above. More specifically, an operation for moving the zoom lens for 0.5 seconds, then limiting the movement of the zoom lens for the second predetermined period of time, and then moving the zoom lens for 0.5 seconds again is repeated until the user finishes operating the zoom key. Thus, noise can also be prevented from being mixed into the pre-learning period 302 or the post-learning period 303, which is required to generate the "predicted audio signal", to enhance an effect of the "noise reduction processing".

Even if contrast AF is performed, a similar effect can be obtained when the control unit 114 controls the operation of the drive unit for moving a focus lens so that the focus lens intermittently moves, similarly to the above-mentioned zoom lens.

While the audio processing unit 105 in the imaging apparatus 100 performs the "noise reduction processing", the imaging apparatus 100 itself need not have the function of performing "noise reduction processing". In the case, an audio signal, a timing when a lens control signal is output, and information representing a noise generation section are associated with one another, and are recorded on the recording medium 108. A computer with an application capable of executing "noise reduction processing" installed therein executes "noise reduction processing" for the audio signal reproduced from the recording medium 108. More specifically, the computer reads out the audio signal and the information representing the noise generation section from the recording medium 108, generates a predicted audio signal from an audio signal or audio signals before and/or after the noise generation section, and subjects the predicted audio signal for an audio signal in the noise generation section. An object of the present exemplary embodiment is achieved even if the "noise reduction processing" is executed in an audio signal processing system including the imaging apparatus 100 as an audio acquisition apparatus and the computer as an audio signal processing apparatus. As the information representing the noise generation section, information representing 25.1 seconds to 25.4 seconds from the start of imaging may be generated and recorded on the recording medium 108. Information indicating that a timing when a lens control signal is output is 25.1 seconds from the start of imaging, and the noise generation section is 0.3 seconds may be recorded on the recording medium 108. Information representing the type of a lens, a drive unit, an amount of driving (an amount of movement of a lens, an amount of adjustment of a diaphragm, etc.), the timing when the lens control signal is output may be recorded.

The control unit 114 may cause the computer to similarly execute the "noise reduction processing" with the communication unit 116 in the imaging apparatus 100 and a communication unit in the computer connected to each other so that data can be transferred by wireless or by wire without via the recording medium 108. In this case, the control unit 114 sends audio signals stored in the buffer memory 207, a predetermined number of samples of the audio signals at a time, to the communication unit 116 as well as the communication unit in the computer. The control unit 114 sends the timing when the lens control signal is output and the information representing the noise generation section to the communication unit 116 as well as the communication unit in the computer. The computer performs the "noise reduction processing" using a sound before or after the noise generation section, like in the present exemplary embodiment, by processing of a particular application having a similar function to that of the noise reduction unit 206 in the present exemplary embodiment, which has been started on the computer. The problem of the present exemplary embodiment can also be solved even by limiting driving of the drive unit or limiting the stop of recording for a particular period, like in the present exemplary embodiment, on the premise of a system connected to the computer capable of executing the "noise reduction processing" in the present exemplary embodiment.

While the imaging apparatus has been described as an example of the audio signal processing apparatus in the present invention, the present invention is also applicable to apparatuses, capable of processing audio signals, other than the imaging apparatus. For example, the present invention is also applicable to a video camera, an integrated circuit (IC) recorder, a mobile phone, a television set, and an automobile, and so on.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-009262 filed Jan. 19, 2010, which is hereby incorporated by reference herein in its entirety.

What is claimed is:

1. An audio signal processing apparatus comprising:
   a drive unit;
   an acquisition unit configured to acquire a first audio signal corresponding to an ambient sound;
   a control unit configured to have a CPU and to control an operation of the drive unit; and
   a noise reduction unit configured to generate a second audio signal for substituting by using the first audio signal acquired by the acquisition unit in at least one of a first period before a driving period during which the drive unit is operating and a second period after the driving period and to substitute the second audio signal for the first audio signal acquired by the acquisition unit in the driving period,
   wherein the first period has a first predetermined time length and the second period has a second predetermined time length, and the first period and the second period are determined in accordance with the driving period, and
   wherein the control unit determines a time length of a limiting period for limiting an operation of the drive unit in accordance with a time length of the first period and limits the operation of the drive unit for the limiting period elapsed since an end of driving of the drive unit.

2. The audio signal processing apparatus according to claim 1, wherein the control unit inhibits, in the limiting period, the operation of the drive unit, or limits the operation of the drive unit so that a sound volume of noise included in the first audio signal acquired in the period during which the drive unit is operating is lowered.

3. The audio signal processing apparatus according to claim 1, wherein the time length of the limiting period differs for a type of the drive unit.

4. The audio signal processing apparatus according to claim 1, further comprising a lens configured to form an optical image of an object, a diaphragm configured to adjust an amount of light of the optical image, and an image sensor configured to convert the optical image into an image signal,
wherein the drive unit moves at least one of the lens and the diaphragm.

5. The audio signal processing apparatus according to claim 1, further comprising:
a recording unit configured to record an audio signal output from the noise reduction unit,
wherein the control unit controls the operation of the drive unit while recording of the audio signal by the recording unit.

6. The audio signal processing apparatus according to claim 1, wherein the control unit stops limiting the operation of the driving unit in accordance with the limited period being elapsed since the end of driving of the drive unit.

7. An audio signal processing apparatus comprising:
a drive unit;
an acquisition unit configured to acquire a first audio signal corresponding to an ambient sound;
a noise reduction unit configured to generate a second audio signal for substituting by using the first audio signal acquired by the acquisition unit in a first period before a driving period during which the drive unit is operating and to substitute the second audio signal for the first audio signal acquired by the acquisition unit in the driving period,
wherein the first period has a first predetermined time length, and the first period is determined in accordance with the driving period; and
a recording unit configured to record an audio signal output from the noise reduction unit on a recording medium;
a control unit configured to have a CPU and to control an operation of the drive unit while recording of the audio signal by the recording unit,
wherein the control unit determines a time length of a limiting period for limiting an operation of the drive unit in accordance with a time length of the first period and limits the operation of the drive unit for the limiting period elapsed since a start of the recording of an audio signal by the recording unit.

8. The audio signal processing apparatus according to claim 7, wherein the control unit inhibits, in the limiting period, the operation of the drive unit, or limits the operation of the drive unit so that a sound volume of noise included in the first audio signal acquired in the period during which the drive unit is operating is lowered.

9. The audio signal processing apparatus according to claim 7, wherein the time length of the limiting period differs for a type of the drive unit.

10. The audio signal processing apparatus according to claim 7, further comprising, a lens configured to form an optical image of an object, a diaphragm configured to adjust an amount of light of the optical image, and an image sensor configured to convert the optical image into an image signal,
wherein the drive unit moves at least one of the lens and the diaphragm.

* * * * *